(12) United States Patent
Takehana

(10) Patent No.: US 9,200,425 B2
(45) Date of Patent: Dec. 1, 2015

(54) GRASPING APPARATUS AND CONSTRUCTION MACHINE

(71) Applicant: JHL CO., LTD., Iruma-gun, Saitama (JP)

(72) Inventor: Kiichi Takehana, Saitama (JP)

(73) Assignee: JHL CO., LTD., Iruma-gun, Saitama (JP)

( * ) Notice: Subject to any disclaimer, the term of this patent is extended or adjusted under 35 U.S.C. 154(b) by 0 days.

(21) Appl. No.: 14/408,395

(22) PCT Filed: May 22, 2013

(86) PCT No.: PCT/JP2013/064170
§ 371 (c)(1),
(2) Date: Dec. 16, 2014

(87) PCT Pub. No.: WO2014/002651
PCT Pub. Date: Jan. 3, 2014

(65) Prior Publication Data
US 2015/0184356 A1    Jul. 2, 2015

(30) Foreign Application Priority Data

Jun. 27, 2012 (JP) ................................. 2012-144387

(51) Int. Cl.
| | |
|---|---|
| B66C 1/00 | (2006.01) |
| E02F 3/413 | (2006.01) |
| B25J 15/08 | (2006.01) |
| E02F 3/40 | (2006.01) |
| E02F 3/42 | (2006.01) |

(52) U.S. Cl.
CPC ............... *E02F 3/4135* (2013.01); *B25J 15/08* (2013.01); *E02F 3/404* (2013.01); *E02F 3/427* (2013.01)

(58) Field of Classification Search
CPC ......... E02F 3/4135; E02F 3/404; E02F 3/427; B25J 15/0014; B25J 15/0213; B25J 15/026

USPC ......... 294/106, 107, 68.23; 37/461, 184, 185, 37/186, 187, 188
See application file for complete search history.

(56) References Cited

U.S. PATENT DOCUMENTS

| | | | | | |
|---|---|---|---|---|---|
| 2,486,544 | A | * | 11/1949 | Allard | B66C 3/12 37/187 |
| 2,725,996 | A | * | 12/1955 | Britton | B66C 3/16 212/247 |
| 3,934,917 | A | * | 1/1976 | Paxton | B66C 3/06 294/110.1 |

(Continued)

FOREIGN PATENT DOCUMENTS

| | | |
|---|---|---|
| JP | 60-081987 U | 6/1985 |
| JP | 60-126660 U | 8/1985 |

(Continued)

*Primary Examiner* — Gabriela Puig
(74) *Attorney, Agent, or Firm* — Muncy, Geissler, Olds & Lowe, P.C.

(57) ABSTRACT

A grasping apparatus that can be miniaturized and compacted to be mountable in small-size equipment or the like and reduced in weight, and a construction machine in which the grasping apparatus is mounted. The grasping apparatus has a gear mechanism 30 in which an annular inner gear 71 is disposed concentrically with a sun gear 73, plural intermediate gears 68 are interposed in an annular space between the inner gear 71 and the sun gear 73, the plural intermediate gears 68 are freely rotatably supported by a bracket secured to a construction machine or the like, a grasping apparatus swing cylinder 23 rotated by the sun gear 73 or the inner gear 71 is equipped to the construction machine or the like as equipment, an upper fork 36 is secured to the inner gear 71, a lower fork 32 that grasps a conveyance target object 90 or the like in cooperation with the upper fork 36 is secured to the sun gear 73 to which rotating force is transmitted from the inner gear 71 through the intermediate gears 68.

7 Claims, 10 Drawing Sheets

(56) References Cited

U.S. PATENT DOCUMENTS 4,174,131 A * 11/1979 Gregg ................. B66C 3/06
294/68.23
2015/0151438 A1* 6/2015 Hecht ................. B25J 15/0004
294/192

FOREIGN PATENT DOCUMENTS

| JP | 02-125054 U | 10/1990 |
|----|-------------|---------|
| JP | 06-012548 U | 2/1994 |
| JP | 2009-019405 A | 1/2009 |

* cited by examiner

FIG.6
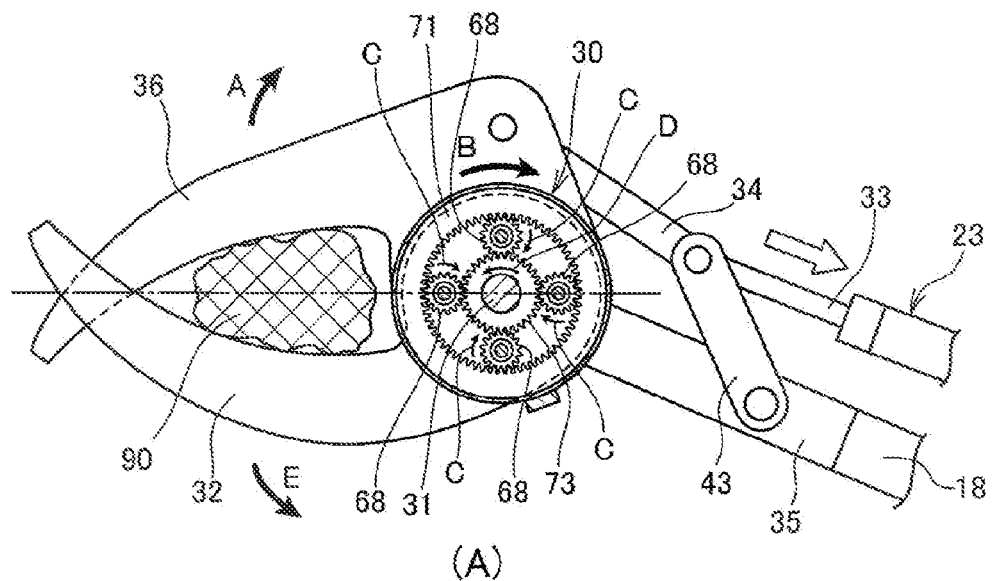
(A)
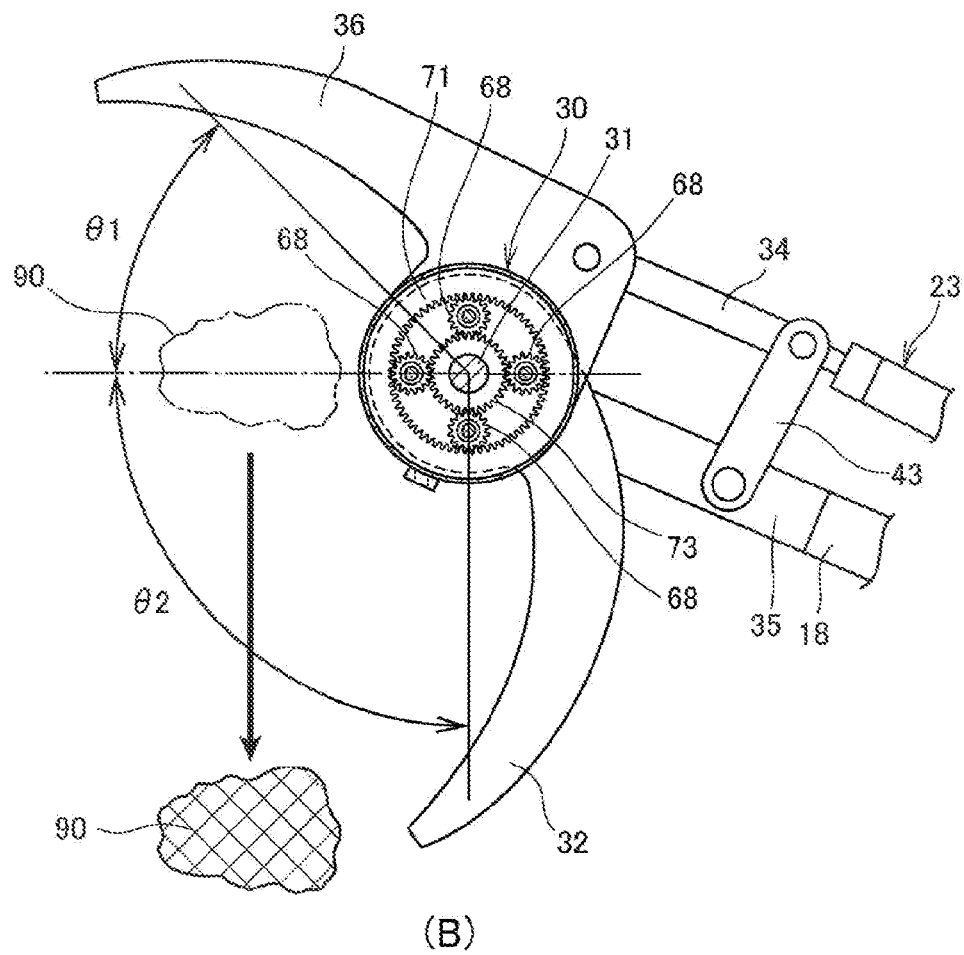
(B)

GRASPING APPARATUS AND CONSTRUCTION MACHINE

CROSS REFERENCE TO RELATED APPLICATIONS

This application is a national stage of International Application No.: PCT/JP2013/064170, which was filed on May 22, 2013, and which claims priority to JP 2012-144387 which was filed on Jun. 27, 2012, and which are both herein incorporated by reference.

TECHNICAL FIELD

The present invention relates to a grasping apparatus for grasping an object to be conveyed or the like, and a construction machine.

BACKGROUND ART

As a grasping apparatus for grasping an object to be conveyed or the like is known a bucket apparatus in which an opening/closing bucket is secured to a main body bucket so as to be openable and closable, and soil is scraped by engaging a gear equipped at the opening/closing bucket side with a gear equipped at the main body bucket side and driving the gear at the main body bucket side with a motor to open/close the opening/closing bucket (see Patent Document 1, for example).

PRIOR ART DOCUMENT

Patent Document

Patent Document 1: JP-UM-A-6-12548

SUMMARY OF THE INVENTION

Problem to be Solved by the Invention

Great opening/closing force is needed when weighty soil is scraped out by the bucket apparatus disclosed in the Patent Document 1, and thus the pair of gears must be designed to be large in size. However, when the gears grow in size, it makes the bucket apparatus itself be large in size, and further causes increase in size of a construction machine or the like in which the bucket apparatus is mounted. Furthermore, in the construction machine or the like, the bucket apparatus is freely detachably secured as an attachment to the tip of an arm. Therefore, when a motor is secured to the bucket apparatus, the weight of the bucket apparatus itself increases, and large driving force is required to move the bucket apparatus.

The present invention has been implemented in view of the foregoing circumstances, and has an object to provide a grasping apparatus that is designed to be small and compact so that it can be mounted in small equipment or the like and the weight thereof is reduced, and a construction machine in which the grasping apparatus is mounted.

Means of Solving the Problem

In order to attain the above object, a grasping apparatus according to the present invention has a gear mechanism in which an annular inner gear is disposed concentrically with a sun gear, and a plurality of intermediate gears are interposed in an annular space between the inner gear and the sun gear, wherein the plurality of intermediate gears are freely rotatably supported by a bracket secured to equipment or the like, an actuator that rotates the sun gear or the inner gear is equipped to the equipment or the like, a first member is secured to the inner gear, and a second member that grasp a conveyance target object or the like in cooperation with the first member is secured to the sun gear to which rotating force is transmitted from the inner gear through the intermediate gears or from which rotating force is transmitted to the inner gear through the intermediate gears.

According to this construction, power which is transmitted from or to the inner gear to or from the sun gear through the plural intermediate gears can be shared by the plural intermediate gears, and the intermediate gears can be miniaturized. Therefore, the gear mechanism can be configured to be small and compact. Furthermore, the grasping apparatus itself is not equipped with any actuator, and thus the grasping apparatus can be configured to be light in weight.

In the above construction, the gear mechanism may be mounted in a gear box, and an O-ring may be equipped between a pair of side plates constituting the gear box and the inner gear to seal the inside of the gear box. According to this construction, dust of earth, muddy water, foreign materials or the like can be prevented entering the gear box.

Furthermore, in the above construction, the ratio in swing angle between the first member and the second member may be changeable by changing the ratio in the number of teeth between the inner gear and the sun gear. According to this construction, the ratio in the number of teeth between the inner gear and the sun gear is changed in accordance with the conveyance target object to be grasped, whereby the conveying work can be efficiently performed.

In the above construction, the second member may be disposed at the lower side of the first member under a grasped state that the first member and the second member are approached to each other and arranged substantially horizontally. According to this construction, the number of teeth of the sun gear is smaller than that of the inner gear, and thus the turning angle of the sun gear can be set to be larger than that of the inner gear. Accordingly, when the first member is upwards swung from the substantially horizontal position, the downward swing angle of the second member from the substantially horizontal position can be set to be larger than the swing angle of the first member.

Furthermore, in the above construction, the first member and the second member may be forks to be equipped to a construction machine. According to this construction, the gasping apparatus may be mounted in a compact construction machine, and a conveyance target object grasped by a pair of forks can be easily dropped when grasping is released.

In the above construction, the first member and the second member may be skeleton type buckets to be equipped to a construction machine. According to this construction, the grasping apparatus can be mounted in a compact construction machine, and a conveyance target object grasped by a pair of buckets can be easily dropped when grasping is released.

Furthermore, in the above construction, the actuator may be linked to the first member. According to this construction, the power transmitted from the inner gear to the sun gear through the plural intermediate gears can be shared by the plural intermediate gears, and the intermediate gears can be configured to be compact. Therefore, the gear mechanism can be configured to be small and compact.

Furthermore, a construction machine according to the present invention has a gear mechanism in which an annular inner gear is disposed concentrically with a sun gear, and a plurality of intermediate gears are interposed in an annular space between the inner gear and the sun gear, wherein the plurality of intermediate gears are freely rotatably supported by a bracket secured to an arm of the construction machine, an actuator that rotates the inner gear is equipped, a first member is secured to the inner gear rotated by the actuator, and a second member that grasps a conveyance target object or the like in cooperation with the first member is secured to the sun gear to which rotating force of the inner gear is transmitted through the intermediate gears.

According to this construction, the power transmitted from or to the inner gear to or from the sun gear through the plural intermediate gears can be shared by the plural intermediate gears, and the intermediate gears can be miniaturized, so that the gear mechanism can be miniaturized and compacted.

Effect of the Invention

According to the present invention, the gear mechanism in which the annular inner gear is disposed concentrically with the sun gear and the plural intermediate gears are interposed in the annular space between the inner gear and the sun gear is provided, the plural intermediate gears are freely rotatably supported by the bracket secured to the equipment or the like, the actuator for rotating the sun gear or the inner gear is equipped to the equipment or the like, the first member is secured to the inner gear, and the second member which grasps the conveyance target object or the like in cooperation with the first member is secured to the sun gear to or from which the rotating force is transmitted from or to the inner gear through the intermediate gears. Therefore, the power transmitted from or to the inner gear to or from the sun gear through the plural intermediate gears can be shared by the plural intermediate gears, and the intermediate gears can be miniaturized, so that the gear mechanism can be miniaturized and compacted. Furthermore, the grasping apparatus can be mounted in compact equipment or the like. Furthermore, the grasping apparatus itself is not equipped with any actuator, and thus the grasping apparatus can be configured to be light in weight.

BRIEF DESCRIPTION OF THE DRAWINGS

[FIG. 6] is an action diagram showing an action of the grasping apparatus.

MODES FOR CARRYING OUT THE INVENTION

Embodiments according to the present invention will be described hereunder with reference to the drawings.

<First Embodiment>

Figure 1:
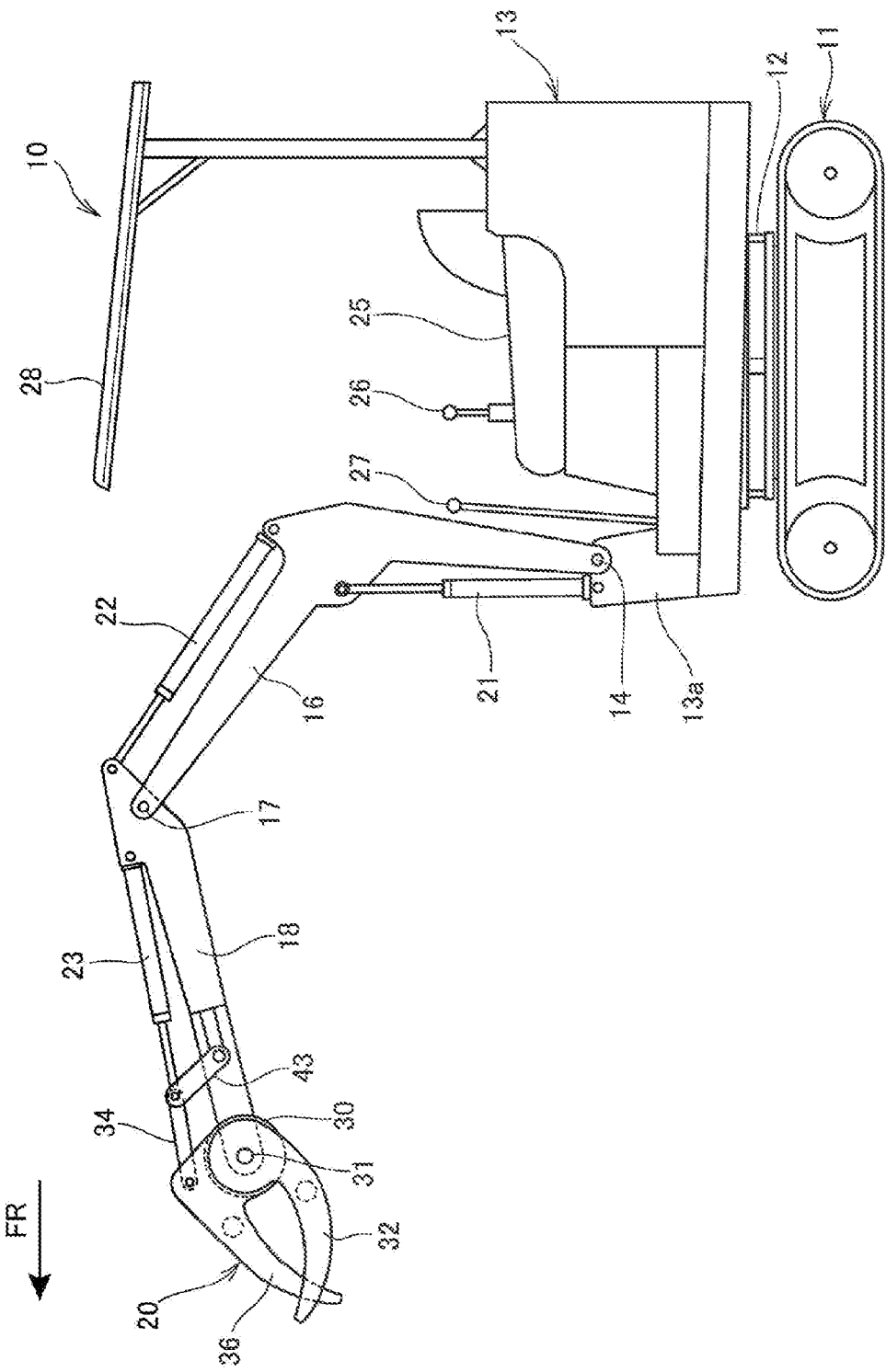
[FIG. 1] is a side view showing a construction machine (first embodiment) of the present invention.

FIG. 1 is a side view showing a construction machine 10 (first embodiment) of the present invention.

The construction machine 10 comprises a crawler type travel apparatus 11 which can travel on irregular ground, soft ground, etc., a swing body 13 secured to the crawler type travel apparatus 11 through a swing apparatus 12, a boom 16 which is freely swingably secured through a support shaft 14 to a base portion 13a equipped at the front lower portion of the swing body 13, an arm 18 which is freely swingably secured to the tip portion of the boom 16 through a support shaft 17, a grasping apparatus 20 secured to the tip portion of the arm 18, a boom cylinder 21 secured between the base portion 13a and the boom 16 to swing the boom 16, an arm cylinder 22 secured between the boom 16 and the arm 18 to swing the arm 18 vertically, a grasping apparatus swing cylinder 23 secured between the arm 18 and the grasping apparatus 20 to swing the grasping apparatus 20, a connecting member 34 for connecting the grasping apparatus swing cylinder 23 with the grasping apparatus 20, and a connecting arm 43 for connecting the arm 18 and the grasping apparatus swing cylinder 23.

The boom cylinder 21, the arm cylinder 22 and the grasping apparatus swing cylinder 23 are hydraulic cylinders which are driven with hydraulic pressure. Reference numeral 25 represents a driver's seat, reference numerals 26, 27 represent control knobs, and reference numeral 28 represents a canopy. Reference character FR represents the front side for a driver who sits on the driver's seat of the construction machine 10, that is, the front side of the construction machine 10 (the same shall apply hereafter). Furthermore, "right and left" described below represent the directions for the driver.

Figure 2:
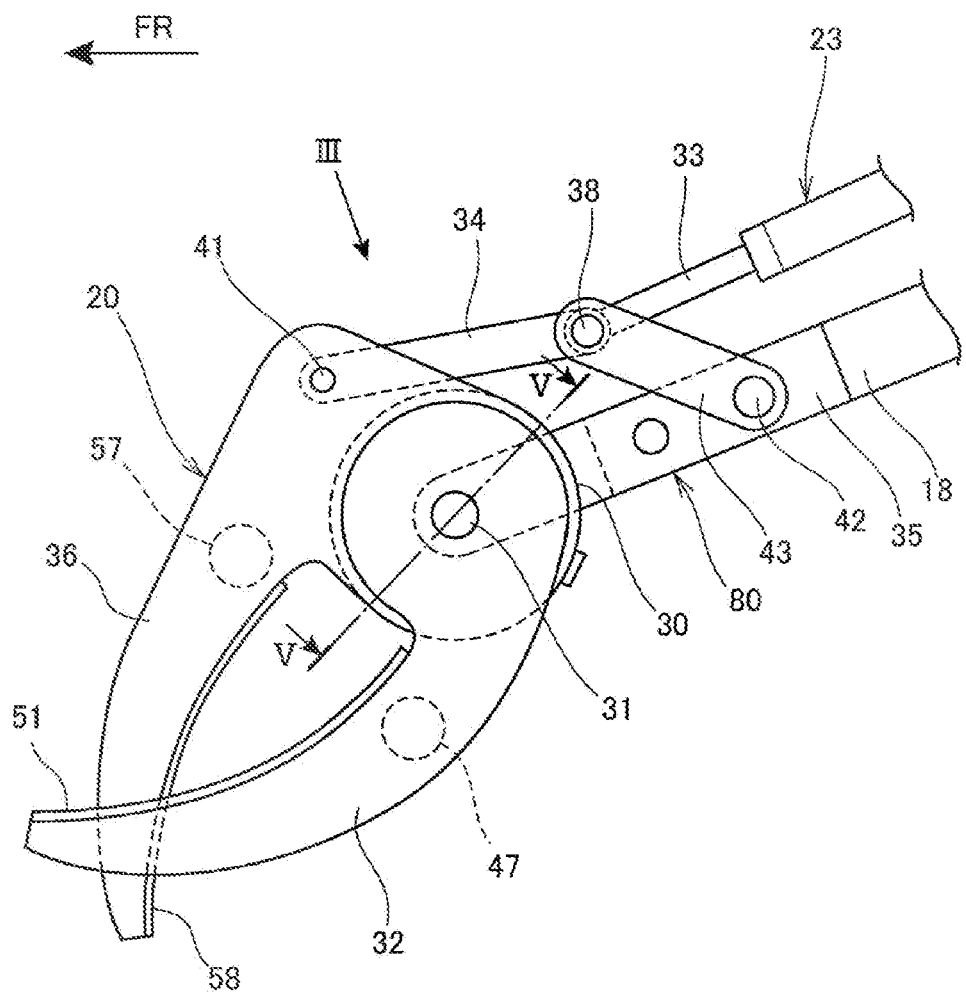
[FIG. 2] is a side view showing a grasping apparatus and a mounting structure thereof.

FIG. 2 is a side view showing the grasping apparatus 20 and a mounting structure thereof.

The grasping apparatus 20 has a bracket 80 which is freely detachably secured to the tip of the arm 18, a gear mechanism 30 secured to the bracket 80, a lower fork 32 secured to the output shaft 31 side of the gear mechanism 30, and an upper fork 36 which is connected through the connecting member 34 to the tip portion of the rod 33 equipped to the grasping apparatus swing cylinder 23 and secured to the outer peripheral portion side of the gear mechanism 30. As described above, the bracket 80 of the grasping apparatus 20 is freely detachably secured to the arm 18, so that the grasping apparatus 20 as an attachment can be detached from the arm 18, and another attachment can be secured to the tip portion of the arm 18. Reference numeral 38 represents a connecting pin through which the grasping apparatus swing cylinder 23 and the connecting member 34 are connected to each other, reference numeral 41 represents a support shaft through which the connecting member 34 and the upper fork 36 are connected to each other, and reference numeral 42 represents a support shaft equipped to the arm 18.

The gear mechanism 30 connects the lower fork 32 and the upper fork 36 through plural gears, and the lower fork 32 is swung through the gear mechanism 30 by swinging the upper fork 36, whereby the state of the upper fork 36 and the lower fork 32 is changed from an approaching state (closed state) to a separate state (opened state) or from the separate state to the approaching state so that an object to be conveyed can be grasped and grasping of an object being conveyed is released.

Figure 3:
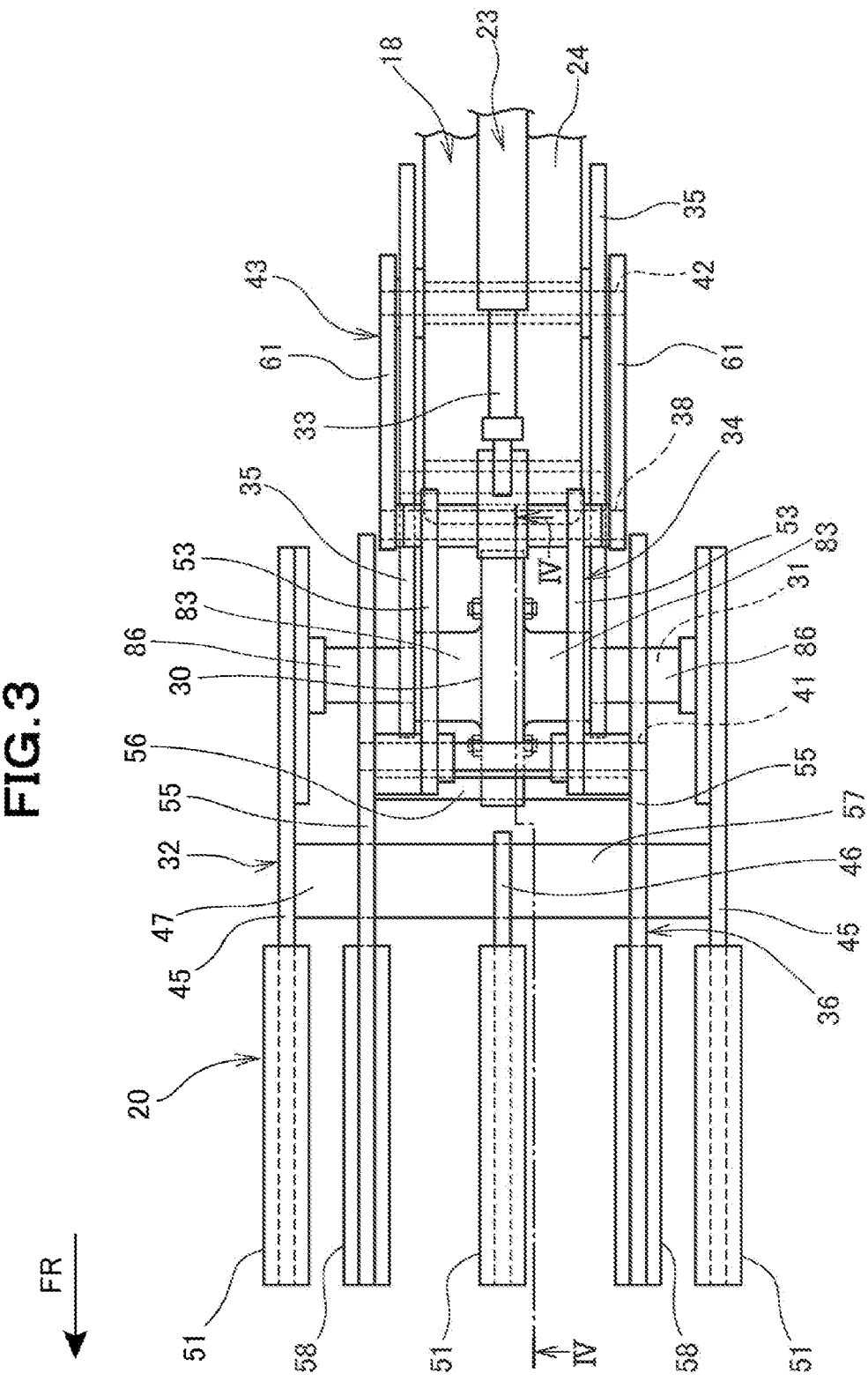
[FIG. 3] is a view from the direction of an arrow III of FIG. 2.

FIG. 3 is a view from the direction of an arrow III of FIG. 2.

A pair of right and left arm extension portions 35, 35 are freely detachably secured to the tip portion of the arm 18, and the tip portions of the arm extension portions 35, 35 are connected to the gear mechanism 30 side.

The gear mechanism 30 is a disc-shaped part disposed at the center in the width direction (right-and-left direction) of the grasping apparatus 20. The output shaft 31 of the gear mechanism 30 extends in the width direction so as to penetrate through the gear mechanism 30, and the lower fork 32 is connected to both the end portions of the output shaft 31.

The lower fork 32 has a pair of right and left side fork single bodies 45, 45 disposed at both sides in the width direction of the grasping apparatus 20, and a center fork single body 46 disposed between these side fork single bodies 45, 45, and a connecting bar 47 for connecting the side fork single bodies 45, 45 and the center fork single body 46 in the width direction. Reference numeral 51 represents cover plates secured to one end faces of the side fork single bodies 45, 45 and the center fork single body 46.

The connecting member 34 has a pair of right and left connecting plates 53, 53 for connecting the connecting pin 38 and the support shaft 41.

The upper fork 36 has a pair of right and left fork single bodies 55, 55 arranged in the width direction of the grasping apparatus 20, and two connecting bars 56, 57 for connecting these fork single bodies 55, 55. One connecting bar 56 is also secured to the outer peripheral portion of the gear mechanism 30, and the outer peripheral portion of the gear mechanism 30 and the fork single bodies 55, 55 are integrally rotatable through the connecting bar 56. Reference numeral 58 represents cover plates secured to one end faces of the fork single bodies 55, 55.

The connecting arm 43 comprises a pair of right and left arm single bodies 61, 61 arranged in the width direction of the grasping apparatus 20, and the connecting pin 38 and the support shaft 42 are connected to each other through the arm single bodies 61, 61.

Figure 4:
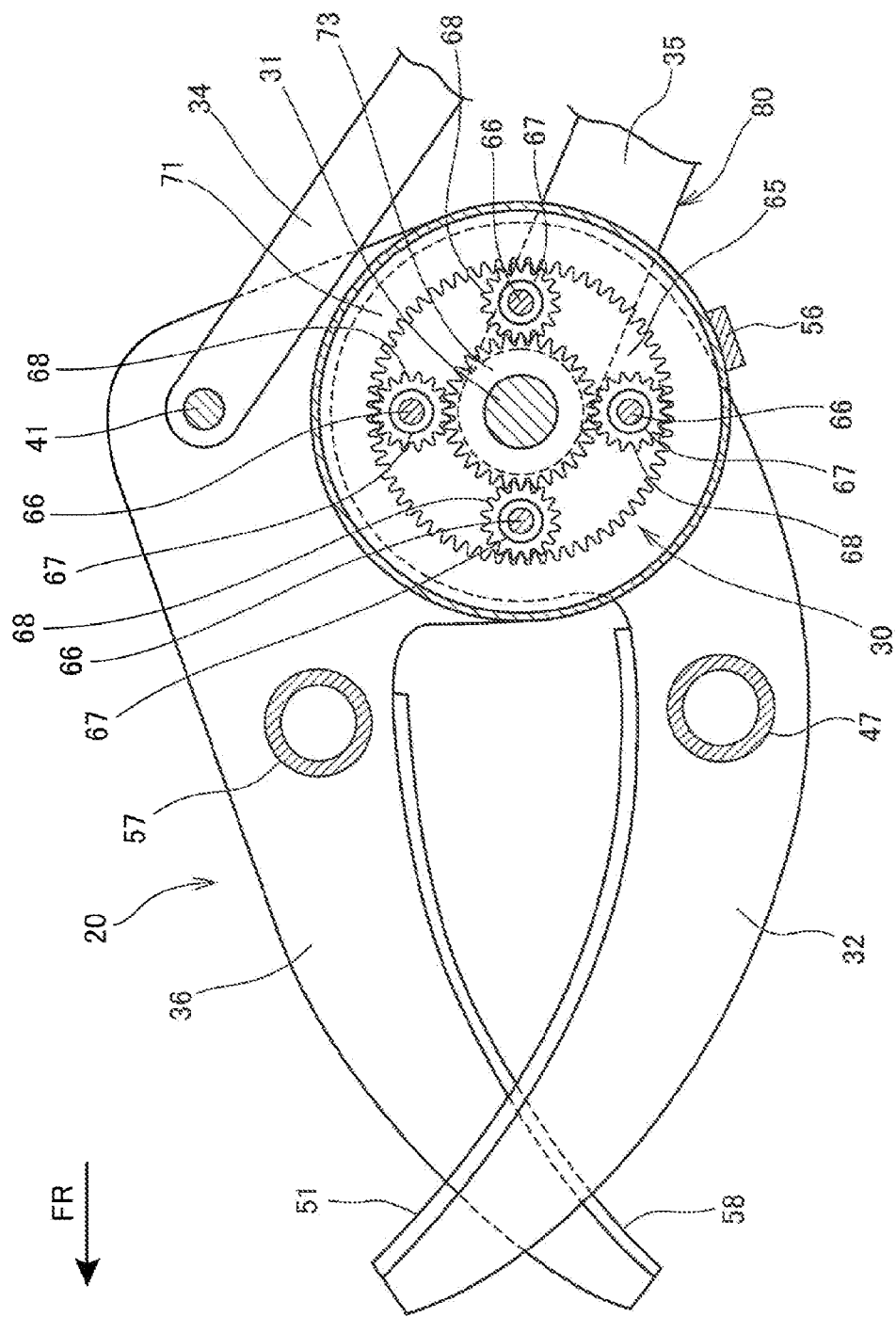
[FIG. 4] is a cross-sectional view taken along IV-IV line of FIG. 3.

FIG. 4 is a cross-sectional view taken along IV-IV line of FIG. 3, and shows the gear mechanism 30.

The gear mechanism 30 has plural collars 67 which are respectively secured to the pair of side plates 65, 65 (only the side plate 65 at the right side is illustrated) with bolts 66, intermediate gears 68 which are respectively rotatably supported by the respective collars 67, an annular inner gear 71 which is disposed at the outside of the plural intermediate gears 68 so as to be engaged with the intermediate gears 68, an output shaft 31 which is rotatably supported by a bracket 80 described later in detail, and a sun gear 73 which is secured to the output shaft 31 and is engaged with the plural intermediate gears 68. The collar 67 has a cylindrical shape, and a bolt 66 is inserted in the collar 67.

The upper fork 36 is secured to the inner gear 71 through the connecting bar 56, and the lower fork 32 is connected to the output shaft 31.

The ratio in the number of teeth between the inner gear 71 and the sun gear 73 is equal to, for example, 2:1. When the inner gear 71 turns, the rotation of the inner gear 71 is transmitted to the sun gear 73 through the plural intermediate gears 68, and the turning angle of the sun gear 73 is twice as large as the turning angle of the inner gear 71.

Figure 5:
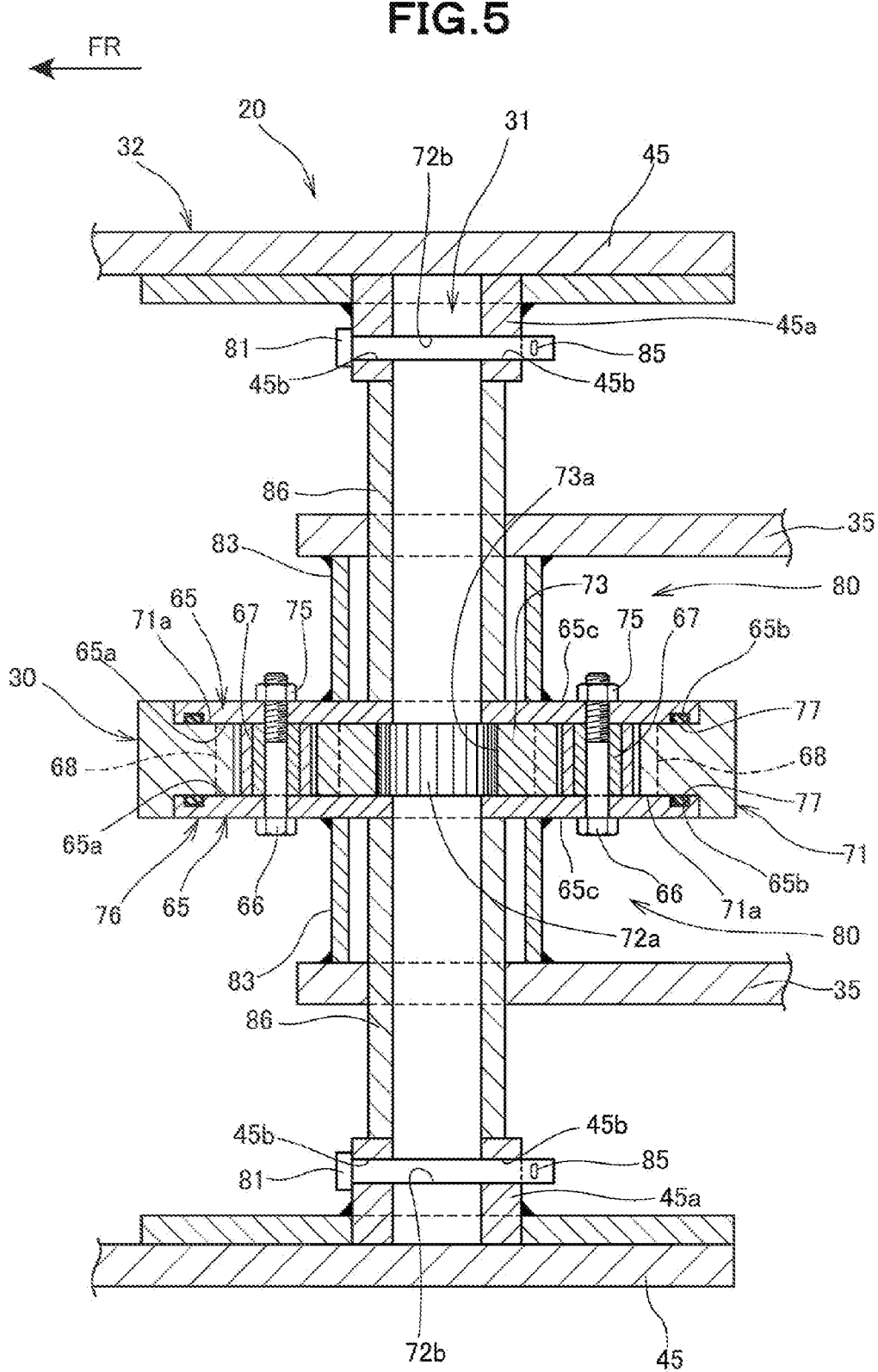
[FIG. 5] is a cross-sectional view taken along V-V line of FIG. 2.

FIG. 5 is a cross-sectional view taken along V-V line of FIG. 2.

In the gear mechanism 30, the side plates 65, 65 are fastened by the bolts 66 penetrating through the side plates 65, 65 and the plural collars 67 and nuts 75 screwed to the tips of the bolts 66 under the state that the plural collars 67 are disposed between the pair of side plates 65, 65. As a result, the distance between the side plates 65, 65 is kept constant, and the clearance between the intermediate gears 68 and the side plates 65, 65 is fixed, so that the rotation of the intermediate gears 68 can be stabilized.

The pair of side plates 65, 65 constitutes a gear box 76 for accommodating the plural intermediate gears 68, the inner gear 71 and the sun gear 73.

Cylindrical portions 83, 83 extending inwards from the arm extension portions 35, 35 in the width direction of the grasping apparatus 20 are secured to the outer surfaces 65c of the side plates 65, 65.

The arm extension portions 35, the cylindrical portions 83 and the side plates 65 are welded to one another to constitute an integrated bracket 80, and the plural intermediate gears 68 are supported through the plural collars 67 by the pair of right and left brackets 80, 80.

The side surfaces 71a, 71a of the inner gear 71 are supported to be slidable on the pair of side plates 65, 65. An annular O-ring groove 65b is formed at the outer peripheral side of the inner surface 65a of each side plate 65, and an O-ring 77 is disposed in the O-ring groove 65b, whereby the gap between the side plate 65 and the inner gear 71 is sealed. As described above, dust of earth, mud, rain water or the like can be prevented from entering the gear box 76 by equipping the O-rings 77, thereby suppressing an effect such as friction or the like at the gear turning support portion and the gear engagement portion in the gear box 76.

The output shaft 31 has a male spline 72a formed at the center portion in the axial direction thereof, and pin holes 72b, 72b which are formed at both the end portions in the axial direction so as to be perpendicular to the axial direction. The male spline 72a is spline-coupled to a female spline 73a formed in the sun gear 73 to transmit power. The pin holes 72b are parts in which retaining pins 81 equipped to the side fork single bodies 45, 45 are inserted so that boss portions 45a equipped to the side fork single bodies 45, 45 are prevented from falling off the output shaft 31 when the side fork single bodies 45, 45 of the lower fork 32 are secured to the output shaft 31. Reference numeral 45b represents pin insertion holes formed in the boss portions 45a, reference numeral 85 represents split pins for preventing the retaining pins 81 from falling off, and reference numeral 86 represents a cylindrical member which is relatively rotatably fitted to the output shaft 31 and disposed between the side plates 65, 65 and the boss portions 45a, 45.

The action of the grasping apparatus 20 described above will be next described.

FIG. 6 is an action diagram showing the action of the grasping apparatus 20, wherein FIG. 6(A) is an action diagram showing a state that an object 90 to be conveyed is grasped, and FIG. 6(B) is an action diagram showing a state that the grasping of the object 90 to be conveyed is released.

In FIG. 6(A), the grasping apparatus swing cylinder 23 is actuated to protrude the rod 33 and swing the upper fork 36 counterclockwise, whereby the inner gear 71 is counterclockwise turned integrally with the upper fork 36, the plural intermediate gears 68 engaged with the inner gear 71 are counterclockwise rotated, the sun gear 73 engaged with the intermediate gears 68 are clockwise turned, and the lower fork 32 secured to the output shaft 31 turning integrally with the sun gear 73 is clockwise swung. As a result, the object 90 to be conveyed is grasped by the upper fork 36 and the lower fork 32.

The rod 33 of the grasping apparatus swing cylinder 23 is pulled as indicated by a void arrow (an arrow defined by an outline) under the state that the object 90 is grasped, whereby the upper fork 36 is swung as indicated by an arrow A, and the inner gear 71 of the gear mechanism 30 is turned as indicated by an arrow B. Accordingly, the respective intermediate gears 68 is rotated as indicated by arrows C, and the sun gear 73 and the output shaft 31 are integrally rotated as indicated by an arrow D. In connection with this rotation, the lower fork 32 secured to the output shaft 31 is swung as indicated by an arrow E.

FIG. 6(B) shows a state that the upper fork 36 and the lower fork 32 are swung and opened. The upper fork 36 is upwards swung at a swing angle θ1 (for example, 45°) from the state shown in FIG. 1, and the lower fork 32 is downwards swung at a swing angle θ2 (for example, 90°) from the state shown in FIG. 1. The swing angle θ2 of the lower fork 32 is larger than the swing angle θ1 of the upper fork 36. As a result, the object 90 conveyed by the upper fork 36 and the lower fork 32 can be easily dropped downwards. Accordingly, it is unnecessary to swing the boom 16 and the arm 18 of the construction machine 10 so that the grasping apparatus 20 is greatly turned downwards. Furthermore, sometimes, a conventional construction machine vibrates an arm to promote dropping of an object being conveyed. However, according to this embodiment, such an operation is unnecessary, and the workability can be more remarkably enhanced.

When power is transmitted from the inner gear 71 to the sun gear 73, the power is distributed and transmitted to the plural intermediate gears 68, so that the intermediate gears 68 can be miniaturized. Accordingly, the outer diameter and width of the gear mechanism 30 can be more greatly reduced to be more compact in size.

As shown in FIGS. 1 and 4 to 6, the gear mechanism 30 is configured to have the annular inner gear 71 disposed concentrically with the sun gear 73, and the plural intermediate gears 68 interposed in the annular space between the inner gear 71 and the sun gear 73, the plural intermediate gears 68 are freely rotatably supported by the bracket 80 secured to the construction machine 10 as equipment or the like, the grasping apparatus swing cylinder 23 as an actuator for rotating the sun gear 73 and the inner gear 71 is equipped to the construction machine 10 as equipment or the like, the upper fork 36 as a first member is secured to the inner gear 71, and the lower fork 32 as a second member for grasping the object 90 to be conveyed or the like in cooperation with the upper fork 36 is secured to the sun gear 73 to or from which rotating force is transmitted from or to the inner gear 71 through the intermediate gears 68.

According to the above construction, the power which is transmitted from the inner gear 71 or the sun gear 73 to the sun gear or the inner gear 71 through the plural intermediate gears 68 can be shared by the plural intermediate gears 68, and the intermediate gears 68 can be miniaturized, so that the gear mechanism 30 can be configured to be small and compact, and thus the grasping apparatus 20 can be configured to be small and compact. Accordingly, the grasping apparatus 20 can be mounted in a compact construction machine 10. Furthermore, since the grasping apparatus 20 itself is not equipped with the grasping apparatus swing cylinder 23 as an actuator, the grasping apparatus 20 can be configured to be light in weight.

As shown in FIG. 5, the gear mechanism 30 is accommodated in the gear box 76, the O-rings 77 are equipped between the pair of side plates 65 constituting the gear box 76 and the inner gear 71, and the inside of the gear box 76 is sealed, so that dust of earth, muddy water, foreign matters or the like can be prevented from entering the gear box 76, abrasion of the respective gears can be prevented to extend the lifetime thereof.

Furthermore, as shown in FIG. 4, the ratio in swing angle between the upper fork 36 and the lower fork 32 can be changed by changing the ratio in the number of teeth between the inner gear 71 and the sun gear 73. Therefore, the conveying work can be efficiently performed by changing the ratio in the number of teeth between the inner gear 71 and the sun gear 73 in accordance with a conveyance target object 90 or the like to be grasped or the like.

As shown in FIG. 6, since the number of teeth of the sun gear 73 is smaller than that of the inner gear 71, the turning angle of the sun gear 73 can be set to be larger than that of the inner gear 71. Accordingly, under a grasped state that the upper fork 36 and the lower fork 32 are approached to each other and arranged substantially horizontally, the lower fork 32 is disposed at the lower side of the upper fork 36. Therefore, when the upper fork 36 is swung upwards from the substantially horizontal position, the downward swing angle β of the lower fork 32 from the substantially horizontal position can be set to be larger than the upward swing angle α of the upper fork 36, so that the conveyance target object 90 or the like which is grasped by the upper fork 36 and the lower fork 32 can be easily dropped down.

As shown in FIG. 1, the first member and the second member are the upper fork 36 and the lower fork 32 as fork to be equipped to the construction machine 10. Therefore, the grasping apparatus 20 can be mounted in the compact construction machine 10, and the conveyance target object 90 grasped by the pair of upper fork 36 and the lower fork 32 can be easily dropped when the grasping is released.

The grasping apparatus swing cylinder 23 is linked to the upper fork 36, and the power transmitted from the inner gear 71 through the plural intermediate gears 68 to the sun gear 73 can be shared by the plural intermediate gears 68. Therefore, the intermediate gears 68 can be configured to be small in size, and thus the gear mechanism 30 can be miniaturized and compacted.

Furthermore, the grasping apparatus 20 does not have any motor for driving the upper fork 36 and the lower fork 32, and the upper fork 36 and the lower fork 32 are swung by the grasping apparatus swing cylinder 23 secured to the arm 18 side, so that the grasping apparatus 20 can be configured to be light in weight. Accordingly, the power required to move the grasping apparatus 20 to the arm 18 side can be reduced.

<Second Embodiment>

Figure 7:
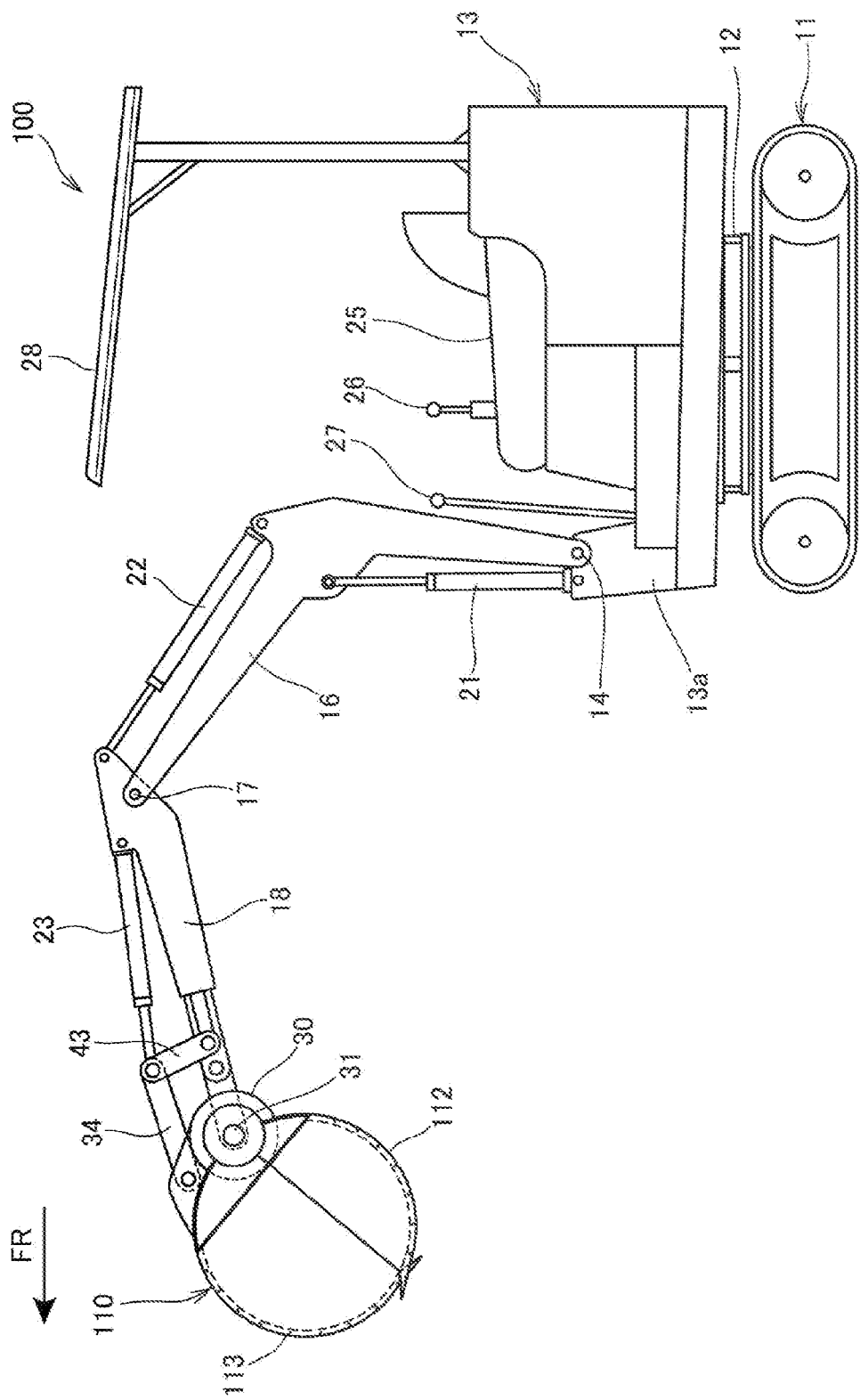
[FIG. 7] is a side view showing a construction machine (second embodiment).

FIG. 7 is a side view showing a construction machine 100 (second embodiment). The same constituent elements as the first embodiment are represented by the same reference numerals, and the detailed descriptions thereof are omitted.

The construction machine 100 is different from the construction machine 10 of the first embodiment (see FIG. 1) only in a skeleton bucket as a grasping apparatus which is secured to the tip portion of the arm 18.

That is, the construction machine 100 is mainly constructed by a crawler type travel apparatus 11, a swing apparatus 12, a swing body 13, a boom 16, an arm 18, a skeleton bucket 110, a boom cylinder 21, an arm cylinder 22 and a grasping apparatus swing cylinder 23.

Figure 8:
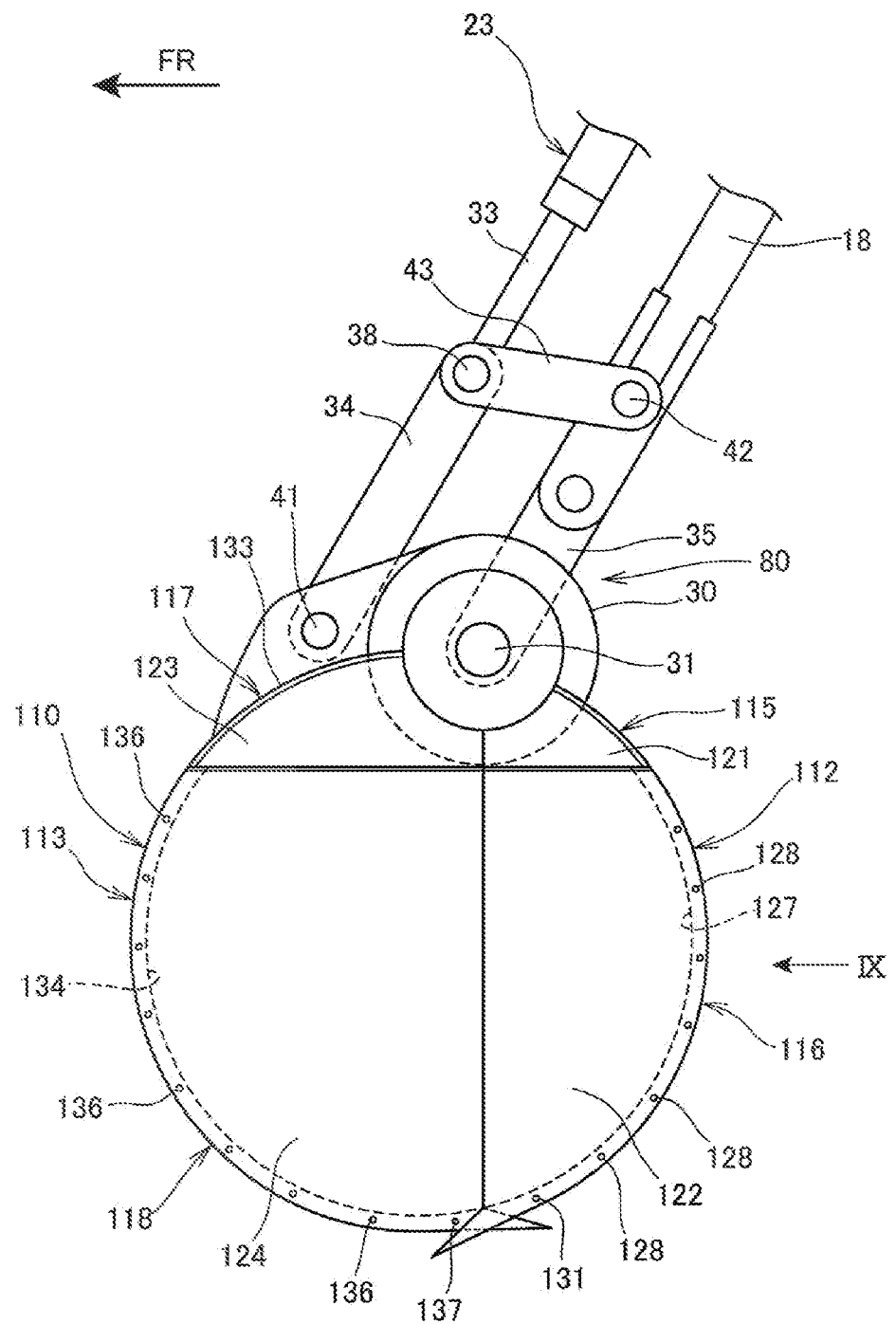
[FIG. 8] is a side view showing a skeleton bucket and a mounting structure thereof.

FIG. 8 is a side view showing the skeleton bucket 110 and a mounting structure thereof.

For example, when mud or the like adheres to a conveyance target object, the skeleton bucket 110 as a grasping apparatus can shake off the mud or the like from the conveyance target object while the conveyance target object is grasped, and has a gear mechanism 30 secured to the tip of the arm 18 through the bracket 80, a lower bucket 112 secured to the output shaft 31 side of the gear mechanism 30, and an upper bucket 113 which is linked to the tip portion of the rod 33 equipped to the grasping apparatus swing cylinder 23 through the link member 34 and secured to the outer peripheral portion side of the gear mechanism 30. When the lower bucket 112 and the upper bucket 113 are closed as shown in FIG. 8, the lower bucket 112 and the upper bucket 113 constitute a cylindrical container having a bottom.

The lower bucket 112 has a lower base portion 115 secured to the output shaft 31 side, and a lower skeleton portion 116 which is equipped integrally with the lower base portion 115. Both the side surfaces of each of the lower base portion 115 and the lower skeleton portion 116 are formed of plates 121, 121.

The upper bucket 113 has an upper base portion 117 secured to the outer peripheral portion (inner gear 71 (see FIG. 4)) side of the gear mechanism 30, and an upper skeleton portion 118 equipped integrally with the upper base portion 117. Both the side surfaces of each of the upper base portion 117 and the upper skeleton portion 118 are formed of plates 123, 124.

The gear mechanism 30 connects the lower bucket 112 and the upper bucket 113 through plural gears, and the lower bucket 112 is swung through the gear mechanism 30 by swinging the upper bucket 113, whereby the state of the upper bucket 113 and the lower bucket 112 is changed from an approaching state (closed state) thereof to a separate state (opened state) or from the separate state to the approaching state, whereby a conveyance target object can be grasped and the grasping can be released.

When the upper bucket 113 and the lower bucket 112 are swung and opened from the state that the conveyance target object is grasped by the upper bucket 113 and the lower bucket 112, and thus the mating faces of the upper bucket 113 and the lower bucket 113 is in a substantially horizontal position, the downward swing angle of the lower bucket 112 is set to be larger than the upward swing angle of the upper bucket 113 through the gear mechanism 30, and the grasped conveyance target object can be easily dropped as in the case of the grasping apparatus 20 (see FIG. 1) of the first embodiment.

Figure 9:
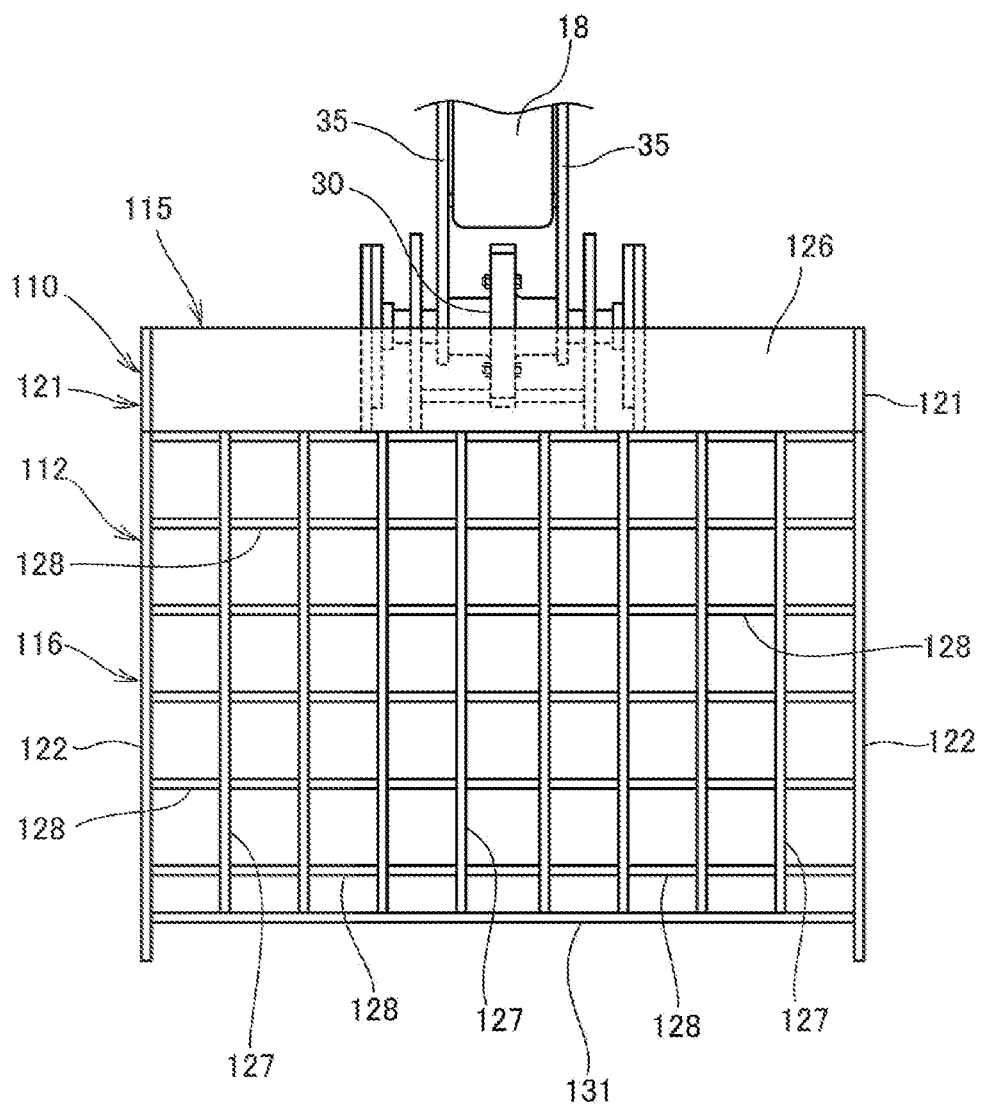
[FIG. 9] is a view from the direction of an arrow IX of FIG. 8.

FIG. 9 is a view taken from an arrow of IX of FIG. 8, and shows the back surface of the skeleton bucket 110.

As shown in FIGS. 8 and 9, in the lower bucket 112, a bucket plate 126 which is arc-shaped in cross-section is secured to the lower base portion 115 so as to form a bottom wall between the plates 121, 121 at both the sides of the lower base portion 115, and the lower skeleton portion 116 has plural ribs 127 which are arc-shaped in side view and extend in the longitudinal direction so as to form a perforated bottom ball between the plates 122, 122 at both the sides of the lower skeleton portion 116, plural bars 128 which are bridged between the respective ribs 127 and a tip bar 131 which is equipped at the tip portion of the lower skeleton portion 116 to link the plural ribs 127.

Returning to FIG. 8, in the upper bucket 113, a bucket plate 133 which is arc-shaped in cross-section is secured to the upper base portion 117 so as to form a bottom wall between the plates 123, 123 (only the plate 123 at the left side is illustrated) at both the sides of the upper base portion 117, and the upper skeleton portion 118 has plural ribs 134 which are arc-shaped in side view and extend in the longitudinal direction so as to form a perforated bottom wall between the plates 124, 124 (only the plate 124 at the left side is illustrated) at both the sides of the upper skeleton portion 118 as in the case of the lower skeleton portion 116, plural bars 136 which are bridged between the respective ribs 134, and a tip bar 137 which is equipped at the tip portion of the upper skeleton portion 118 to link the plural ribs 134.

The upper bucket 113 and the lower bucket 112 are formed like a basket as described above. Therefore, when a conveyance target object or the like to which mud, water or the like adheres is grasped, the mud, the water or the like can be easily discharged from the meshes of the basket.

As shown in FIGS. 7 and 8, the first member and the second member are the upper bucket 113 and the lower bucket 112 as a skeleton type bucket equipped to the construction machine 100. Therefore, the skeleton bucket 110 as a grasping apparatus can be mounted in the small-size construction machine 100, and the conveyance target object 90 grasped by the pair of the upper bucket 113 and the lower bucket 112 can be easily dropped when the grasping is released.

<Third Embodiment>

Figure 10:
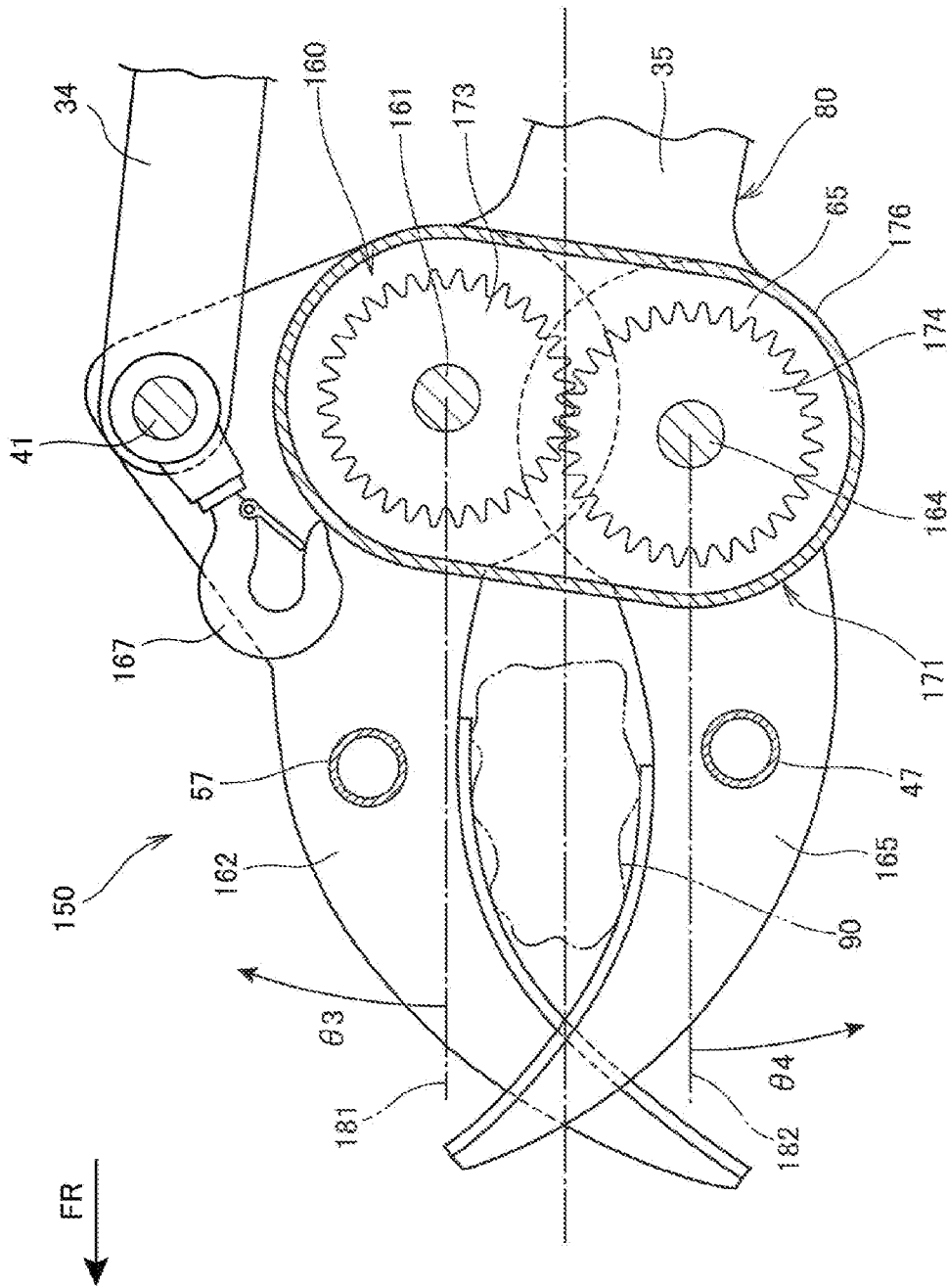
[FIG. 10] is a cross-sectional view showing a grasping apparatus (third embodiment).

FIG. 10 is a cross-sectional view showing a gasping apparatus 150 (third embodiment). The same constituent elements as the first embodiment shown in FIG. 1 are represented by the same reference numerals, and the detailed descriptions thereof are omitted.

The grasping apparatus 150 has a bracket 80 which is freely detachably secured to the tip of the arm 18 (see FIG. 1), a gear mechanism 160 secured to the bracket 80, plural upper forks 162 which are secured to an upper output shaft 161 equipped to the gear mechanism 160 and freely swingably linked to the tip portion of the link member 34 through a support shaft 41, plural lower forks 165 secured to a lower output shaft 164 equipped to the gear mechanism 160, and a hook 167 which is freely swingably secured to the support shaft 41 to hang up a conveyance target object through a wire or the like.

The gear mechanism 160 has a gearbox 171, the upper output shaft 161 and the lower output shaft 164 which are freely rotatably supported in the gearbox 171, an upper gear 173 which is disposed in the gear box 171 and secured to the upper output shaft 161, and a lower gear 174 which is disposed in the gear box 171 and secured to the lower output shaft 164, and the upper gear 173 and the lower gear 174 are engaged with each other. The upper gear 173 and the lower gear 174 are parts having the same shape, and equal to each other in the number of teeth and tooth width. Therefore, the cost of formation, management, etc. of these parts can be reduced.

The gear box 171 has a pair of side plates 65, 65 (only the side plate 65 at the right side is illustrated), an outer peripheral wall member 176 secured to the peripheral edge portions of the side plates 65, 65, and O-rings (not shown) for sealing the gap between the side plate 65, 65 and the outer peripheral wall member 176. The O-ring is a part for preventing dust of earth, muddy water, foreign matter or the like from entering the gear box 171.

Next, the action of the grasping apparatus 150 described above will be described.

The grasping apparatus swing cylinder 23 (see FIG. 6(A)) is actuated to protrude the rod 33 (see FIG. 6(A)) and swing the upper fork 162 counterclockwise, whereby the upper gear 173 is counterclockwise turned through the upper output shaft 161 integrally with the upper fork 162, the lower gear 174 engaged with the upper gear 173 is clockwise turned and the lower fork 165 secured to the lower gear 174 through the lower output shaft 164 is clockwise swung. As a result, the upper fork 162 and the lower fork 165 are closed, and the upper fork 162 and the lower fork 165 are allowed to grasp the conveyance target object 90.

Furthermore, the rod 33 of the grasping apparatus swing cylinder 23 is pulled from the state that the conveyance target object 90 is grasped (the state of FIG. 10), whereby the upper fork 162 is clockwise swung, and the upper gear 173 is clockwise turned through the upper output shaft 161. Accordingly, the lower gear 174 is counterclockwise turned, and the lower fork 165 is counterclockwise swung through the lower output shaft 164. As a result, the upper fork 162 and the lower fork 165 are opened, and the grasping of the conveyance target object 90 is released, and the conveyance target object 90 can be dropped.

Since the upper gear 173 and the lower gear 174 have the same number of teeth, the swing angle θ3 of the upper fork 162 which swings upwards around the upper output shaft 161 with respect to a horizontal line 181 passing the center of the cross-section of the upper output shaft 161 can be set to be equal to the swing angle θ4 of the lower fork 165 which swings downwards around the lower output shaft 164 with respect to a horizontal line 182 passing the center of the cross-section of the lower output shaft 164.

When the number of teeth is set to be different between the upper gear 173 and the lower gear 174, for example, the number of teeth of the lower gear 174 is set to be smaller than that of the upper gear 173, the swing angle θ4 of the lower fork 165 can be set to be larger than the swing angle θ3 of the upper fork 162, and the lower fork 165 can be swung downwards more greatly, so that the grasped conveyance target object 90 can be easily dropped.

Furthermore, the grasping apparatus 150 does not have any motor for driving the upper fork 162 and the lower fork 165, and the upper fork 162 and the lower fork 165 are swung by the gasping apparatus swing cylinder 23 secured to the arm 18 side, so that the grasping apparatus 150 can be configured to be light in weight. Accordingly, the power for driving the grasping apparatus 150 relatively to the arm 18 (see FIG. 1) side can be reduced.

The above embodiments described above are merely examples of the present invention, and any modification and application may be made without departing from the subject matter of the present invention.

For example, in the above embodiments, the grasping apparatus swing cylinder 23 is linked to the upper fork 36 side in FIG. 2. However, the present invention is not limited to this style, and the grasping apparatus swing cylinder 23 may be linked to the lower fork 32 side.

In FIG. 4, the ratio in the number of teeth between the inner gear 71 and the sun gear 73 is set to 2:1. However, the present invention is not limited to this style, and it may be arbitrarily changed in accordance with an environment of usage of the grasping apparatus 20. In FIG. 4, the number of the intermediate gears 68 is set too. However, the present invention is not limited to this number, and a plurality of intermediate gears 68 may be equipped. Furthermore, in FIG. 4, the upper fork 36 is linked to the inner gear 71 side, and the lower fork 32 is linked to the output shaft 31 side. However, the present invention is not limited to this style, and the lower fork 32 may be linked to the inner gear 71 side while the upper fork 36 may be linked to the output shaft 31 side. In this case, the grasping apparatus swing cylinder 23 is linked to any one of the upper fork 36 and the lower fork 32.

In FIG. 5, the male spline 72a is formed in the outer shaft 31, and the female spline 73a is formed in the sun gear 73 so that the male spline 72a and the female spline 73a are spline-coupled to each other. However, the present invention is not limited to this style, and the sun gear 73 may be directly secured to the output shaft 31.

Furthermore, as shown in FIG. 5, the gap between the inner gear 71 and the side plate 65 is sealed by the O-ring 77. However, the present invention is not limited to this style, and the gap may be sealed by oil seal having seal lip. In this case, leakage of lubricant oil filled in the gear box 76 (see FIG. 5) and contamination of foreign materials from the outside into the gear box 76 can be prevented by the oil seal.

Furthermore, the present invention is not limited to a construction machine, and may be applied to a grasping apparatus, a pinching apparatus, a conveying apparatus or a sieving apparatus used in various kinds of industries such as a civil engineering work, a garden making work, a piping work, agriculture, livestock farming, a forest industry, a fishery industry, iron and steel industries, a shipbuilding industry, etc., a rubble dealing work under a building construction work or in a devastated district, a demolition work of buildings, a waste treatment, etc.

Description of Reference Numerals 10, 100 construction machine, equipment
    20, 150 grasping apparatus
    23 grasping apparatus swing cylinder (actuator)
    30 gear mechanism
    31 output shaft
    32 lower fork (second member)
    36 upper fork (first member)
    65 side plate
    68 intermediate gear
    71 inner gear
    73 sun gear
    76 gear box
    77 O-ring
    80 bracket
    90 conveyance target object
    110 skeleton bucket (grasping apparatus)
    112 lower bucket (second member)
    113 upper bucket (first member)

The invention claimed is:

1. A grasping apparatus comprising:
a gear mechanism having an annular inner gear disposed concentrically with a sun gear; and
a plurality of intermediate gears interposed in an annular space between the inner gear and the sun gear, the plurality of intermediate gears being freely rotatably supported by a bracket secured to equipment;
an actuator that rotates the inner gear;
a first member secured to the inner gear; and
a second member that grasps a conveyance target object in cooperation with the first member and is secured to the sun gear to which rotating force of the inner gear is transmitted through the intermediate gears.

2. The grasping apparatus according to claim 1, wherein the gear mechanism is mounted in a gear box, and an O-ring is equipped between a pair of side plates constituting the gear box and the inner gear to seal the inside of the gear box.

3. The grasping apparatus according to claim 1, wherein the ratio in swing angle between the first member and the second member is changeable by changing the ratio in the number of teeth between the inner gear and the sun gear.

4. The grasping apparatus according to claim 1, wherein the second member is disposed at the lower side of the first member under a grasped state that the first member and the second member are approached to each other and arranged substantially horizontally.

5. The grasping apparatus according to claim 1, wherein the first member and the second member are forks to be equipped to a construction machine.

6. The grasping apparatus according to claim 1, wherein the first member and the second member are skeleton type buckets to be equipped to a construction machine.

7. A construction machine comprising:
a gear mechanism having an annular inner gear disposed concentrically with a sun gear;
a plurality of intermediate gears interposed in an annular space between the inner gear and the sun gear, the plurality of intermediate gears being freely rotatably supported by a bracket secured to an arm of the construction machine;
an actuator that rotates the inner gear;
a first member secured to the inner gear rotated by the actuator; and
a second member that grasps a conveyance target object in cooperation with the first member and is secured to the sun gear to which rotating force of the inner gear is transmitted through the intermediate gears.

* * * * *